United States Patent [19]

Tusa et al.

[11] Patent Number: 4,861,519

[45] Date of Patent: Aug. 29, 1989

[54] METHOD FOR VOLUME REDUCTION OF LOW ACTIVITY ORGANIC WASTES FROM NUCLEAR POWER PLANTS BY ANAEROBIC DECOMPOSITION

[75] Inventors: Esko Tusa, Kauniainen; Raimo Määättä, Helsinki; Antti Ruuskanen, Kerava, all of Finland

[73] Assignee: Imatran Voima Oy, Finland

[21] Appl. No.: 173,650

[22] Filed: Mar. 25, 1988

[30] Foreign Application Priority Data

Apr. 8, 1987 [FI] Finland .................................. 871550

[51] Int. Cl.⁴ ........................... C02F 3/28; C02F 3/00; G21F 9/12; G21F 9/00

[52] U.S. Cl. ................................ 252/633; 48/197 FM; 48/197 A; 71/10; 71/12; 210/603; 210/605; 210/610; 210/611; 210/612; 210/630; 210/751; 252/626; 252/628; 435/262; 435/801; 435/822

[58] Field of Search ............... 252/626, 628, 631, 632, 252/633; 48/197 A, 197 FM; 71/8, 10, 12, 13, 14, 15, 22; 210/601, 603, 167, 605, 610, 611, 612, 613, 615, 617, 630, 631, 170, 751, 903, 928; 422/184, 193; 110/237, 221, 222, 341–342; 435/262, 801, 819, 842, 822

[56] References Cited

U.S. PATENT DOCUMENTS

| | | | |
|---|---|---|---|
| 3,956,118 | 5/1976 | Kleber et al. | 210/710 |
| 3,959,125 | 5/1976 | Teletzke | 210/901 |
| 4,133,273 | 1/1979 | Glennon | 110/346 |
| 4,174,371 | 11/1979 | Bell et al. | 71/12 |
| 4,198,292 | 4/1980 | Snider et al. | 210/612 |
| 4,252,901 | 2/1981 | Fischer et al. | 71/10 |
| 4,273,615 | 6/1981 | Hirbod | 376/275 |
| 4,351,729 | 9/1982 | Witt | 210/903 |
| 4,529,701 | 7/1985 | Seely | 435/842 |
| 4,614,587 | 9/1986 | Andersson et al. | 210/928 |
| 4,664,804 | 5/1987 | Morper et al. | 210/605 |
| 4,678,582 | 7/1987 | Lavigne | 210/602 |
| 4,758,344 | 7/1988 | Wildenauer | 210/717 |

Primary Examiner—Howard J. Locker
Attorney, Agent, or Firm—Steinberg & Raskin

[57] ABSTRACT

The invention relates to a method and apparatus for the reduction in the quantity of low activity organic wastes from nuclear power plants. This is accomplished using anaerobic fermentation in a bioreactor. The waste from the nuclear power plant is subjected to a pretreatment such as comminution and suspension, hydrolysis and/or physical dispersion, such as by a irradiation, heat treatment or the equivalent. The pretreated waste is subjected to anaerobic decomposition in a bioreactor, the anaerobic decomposition taking place in two stages, namely an acid stage and a methane stage. The gases produced in the decomposition process are conducted from the methane stage to a gas burning stage and the undecomposed waste is removed, concentrated and packed in barrels or the like for storage.

13 Claims, 2 Drawing Sheets

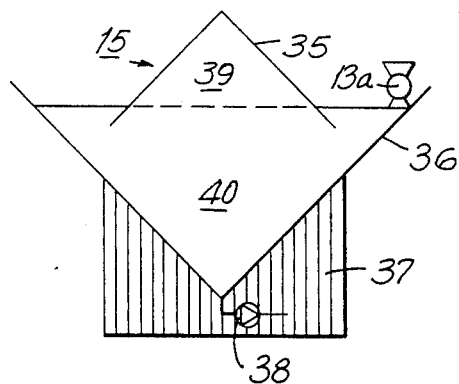
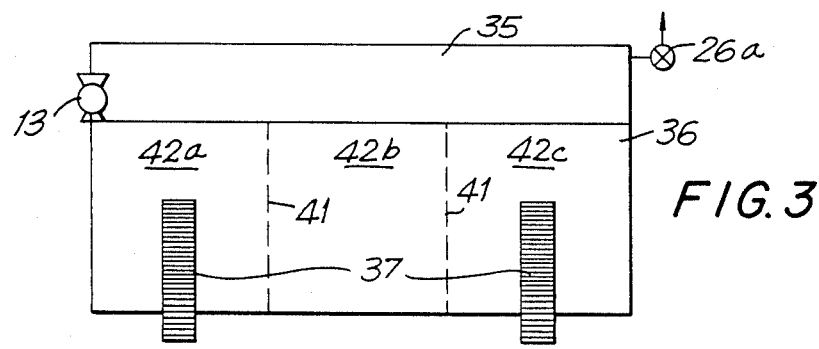
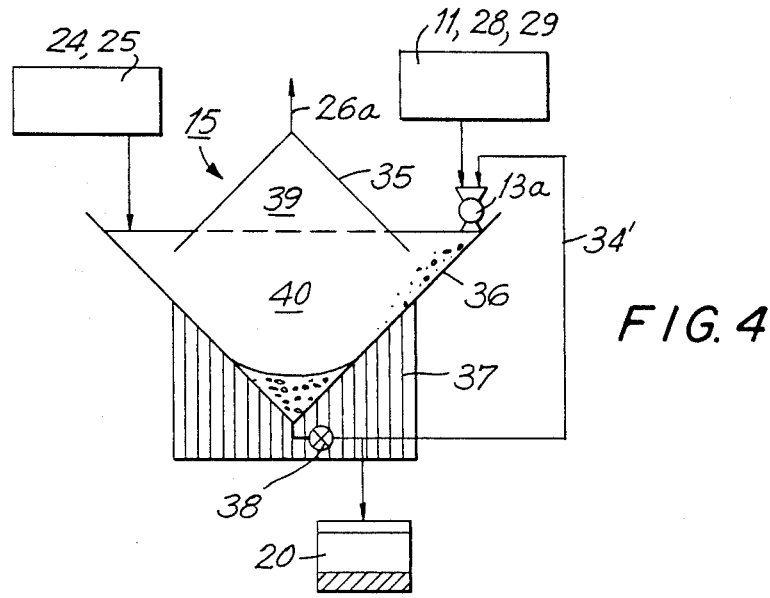

METHOD FOR VOLUME REDUCTION OF LOW ACTIVITY ORGANIC WASTES FROM NUCLEAR POWER PLANTS BY ANAEROBIC DECOMPOSITION

BACKGROUND OF THE INVENTION

Various wastes are produced in nuclear power plants, part of which are radioactive. The wastes have not been classified by activity, however, all of the wastes are considered to be so called low activity wastes. The greater part of the wastes consists of paper or other organic material. Table 1 below sets forth the composition of low activity wastes of IVO (the power company Imatran Voima Osakeyhtio). Different principles have been applied in classifying the wastes of TVO (the power company Teollisuuden Voima Osakeyhtio), as can be seen in Table 2 below).

TABLE 1

| Composition of the low activity waste accruing in the nuclear power plant of IVO. | |
|---|---|
| Type of Waste | Quantity (kg per annum) |
| Paper | 7500 |
| Miscellaneous rag goods | 1500 |
| Plastics and rubber | 700 |
| Timber and wood | 300 |
| Total | 1000 |

TABLE 2

| Composition of the low activity waste accruing in the nuclear power plant of TVO. | |
|---|---|
| Type of Waste | Quantity (kg per annum) |
| Paper/cardboard/wood | 4000 |
| Machine towels/cotton gloves/overalls | 4000 |
| Fireproofed fabric | 2000 |
| Plastics and rubber | 10000 |
| Total | 20000 |

At the present time, wastes have been placed in barrels having a cpacity of about 200 liters. Assuming one barrel to hold 50 kg, the annual waste quantity, expressed in barrels, will be about 200 barrels at IVO and 400 at TVO. Thus, at the present, these two nuclear power plants alone, aggregate about 6000 barrels of low activity wastes for storage.

The original plans envisioned ultimate disposition of these wastes in spaces blasted out from bedrock. However, this is an expensive solution, and can give rise to various detrimental factors in the future. Thus, the organic material begins to decompose through the decades, producing various gaseous substances. The report "The Gas Production Due to Microbiological Activity in the VLJ Ultimate Disposal Facilities, Report UJT-84-16" estimates the quantity of gas formed to be several tens of cubic meters per annum during about 100 years.

SUMMARY OF THE INVENTION

It is a primary object of the present invention to provide a method which permits lower activity organic wastes from nuclear power plants to be treated so that the volume of the waste that must ultimately be disposed can be substantialy reduced.

It is another object of the present invention to provide a method for the reduction of the volume of low activity organic wastes from nuclear power plants that must be disposed of by subjecting the waste to anaerobic fermentation.

Other objects and advantages of the present invention will be apparent froma further reading of the specification and of the appended claims.

With the above and other objects in view, the present invention mainly comprises, subjecting organic waste from a nuclear power plant to a pretreatment to render the same more suitable for anaerobic decomposition, such as by comminuting and suspending the same, subjecting the same to hydrolysis and/or physical dispersion such as radiation, heat treatment or the equivalent, subjecting the pretreated organic waste to anaerobic decomposition in a bioreactor in two stages, the first stage being an acid storage and the second stage being a methane stage, burning the gasses produced during the decomposition process, and removing the undecomposed waste and packaging the same for subsequent disposition.

It is a further object of the present invention to provide a bioreactor which permits low activity waste from nuclear power plants to be treated so that the quantity of waste to be ultimately disposed of can be substantially reduced.

The bioreactor of the invention is mainly characterized in that the bioreactor is a bipartite reactor comprising a cover part and a bottom part which are detachable from each other, the bioreactor constituting an enclosed space which comprises a gas space and a liquid space.

The method and apparatus of the present invention provides many significant advantages. Most important, the volume of the waste that it treated and must ultimately be disposed of can be reduced to as low as 5–10% of the original quantity of waste. Furthermore, the waste to be ultimately disposed of is converted into a stable state which does not over periods of time produce detrimental gas formation. In addition, the process of the present invention is relatively fast and is effective on most waste fractions. Still further, the process of the invention is a closed process and does not create environmental disturbances.

The process of the present invention can be applied to the treatment of a variety of wastes. In other words, a wide range of wastes from readily decomposable wastes to waste which is refractory can be treated in accordance with the present invention.

In the process of the invention, various pretreating methods can be utilized, including grinding and suspending, hydrolysis or chemical cleaving or initial decomposition, physical decomposition, such as by ultraviolet light, irradiation, heat treatment by heating or refrigeration, etc. In the process of the invention, chemicals required in the processor are added, if needed, including: e.g. pH adjusting chemicals, nutrient salts, trace substances and thickening substances which are used in the final concentration of the waste.

The gas produced in the process of the invention can be used towards maintaining the process temperature. The method can be carried out within a wide temperature range, for example in the range of from 5°–65° C. However, the temperature range which is most advantageous and most recommended in view of energy economy is a temperature of 20°–35° C. It is obvious that the speed of the process can be increased at a higher temperature range.

The appropriate dry matter content in the process is about 5–10%. The process of the invention requires replacement water of only about 1% of the waste quantity that is being treated. Still further, the process of the invention may be enhanced by developing a bacterial strain which is most suited for use in the process.

The decomposition process of the present invention may be subdivided in two, three or more blocks. If this is done, the wastes which are most difficult to decompose such as resin, are decomposed in the first block. In the second block, the treatment is directed to readily recomposable wastes such as paper, wood, cotton, cardboard, wool, etc. In such case, the bioreactor is provided with partitions which divide the bioreactor into individual blocks. The volumetric capacity of each block is selected in accordance with the time of material has to spend in the block, in other words in accordance with rate of decomposition.

BRIEF DESCRIPTION OF THE DRAWINGS

The invention is described in detail, referring to advantageous embodiments of the invention, which are apparent from the figures of the attached drawings, in which:

FIG. 2 is an elevational view of one embodiment of the bioreactor used in carrying out the process of the invention;

FIG. 3 is a front view of the bioreactor of FIG. 2; and

FIG. 4 is an elevational view of the bioreactor of FIG. 2.

DETAILED DESCRIPTION OF THE EMBODIMENTS OF THE INVENTION

Figure 1:
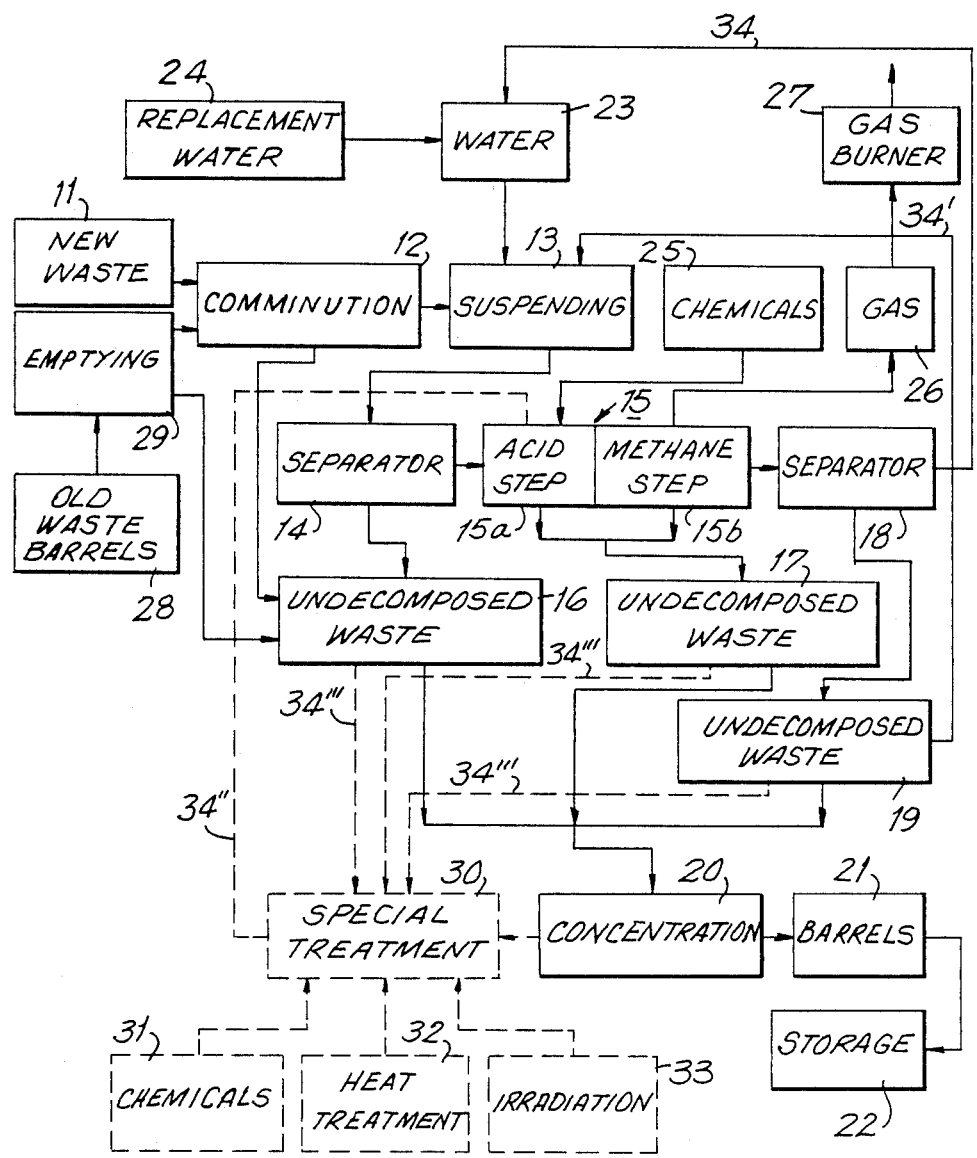
FIG. 1 is a schematic block diagram setting forth the embodiments of the process of the invention.

The process and apparatus of the present invention are described in the following description of the drawings setting forth preferred embodiments of the invention. It is to be understood the variations and modifications of the invention can be made.

The procedure of the invention comprises several partial processes, which are apparent in the following description of FIG. 1. The first partial process is a waste gathering and emptying of the waste barrels. In FIG. 11, new waste is indicated by block 1. Old waste barrels are represented by block 28, and barrel emptying, by block 29. The next partial process in comminution of the waste, indicated by block 12 in FIG. 1. The comminuted waste is then suspended, this being indicated by block 13, in FIG. 1. As previously set forth, instead of comminution and suspending, it is also possible to pretreat the waste by hydrolysis and/or physical dispersion, such as by irradiation, heat treatment or the equivalent.

The suspended waste is conducted to a separator 14 from which the decomposable waste is conducted to a bioreactor 15 in accordance with the invention. In the bioreactor 15, anaerobic decomposition takes place in two steps, the first step being an acid step 15a, and the second step being a methane step 15b. The undecomposed waste is removed from the separator 14 to block 16. The decomposed waste from the bioreactor 15 is conducted to block 17, and the anaerobically decomposed waste is conducted to the separator 18, where separation of undecomposed matter and water takes place. The undecomposed waste is conducted to block 19 and the water is returned by circulation line 34 to the water tank 23. Replacement water is conducted from block 24 to water tank 23.

The undecomposed waste removed from the process is conducted from blocks 16, 17 and 19 to concentration block 20 from which the treated waste is packed in barrels 21 which are conveyed to storage 22. Chemicals are added into the bioreactor 15 from the block 25. The gases produced in the methane step 15b of the bioreactor 15 are conducted to block 26 and then to gas burning block 27.

The process of the invention may also comprise special treatments, which have been indicated as block 30 in FIG. 1. The waste may, in such case be treated with chemicals in block 31, by heat treatment in block 32 and with ultraviolet radiation in block 33.

In the acid step 15a and/or the methane step 15b of the bioreactor, chemicals required in the decomposition process are added, such as nutrient salts, trace substances, pH regulating agents, thickening agents, and the like. For nutrient salts, nitrogen and phosphorus compounds are advantageously used. For trace substances, cobalt, nickel or molybenum are advantageously used, and flocculents may be used for thickening agents.

As can be seen in FIG. 1 the undecomposed waste may be circulated by the line 34' back to the bioreactor 15. If desired the undecomposed waste may be conducted from blocks 16, 17 and 19 along lines 34''' to the special treatment 30, where the undecomposed waste is subjected to special treatment with the aid of hydrolysis and/or physical dispersion and then returned by the circulation line 34'' to the bioreactor 15.

As can be seen in FIGS. 2 and 3, the bioreactor 15 of the invention is bipartite. The bioreactor 15 comprises a cover part 35 and a bottom part 36, the two being detachable from each other. This type of design is desirable from a standpoint of transport. Moreover, the design requires little space and therefore the apparatus can also be transported through narrow passages.

The cover part 35, and respectively the bottom part 36, may further be subdivided and assembled at the site of installation. The parts of the bioreactor 15 of the invention may be disassembled while the process is running and disturbances, if any, can be removed without obstacle. It is thus understood that the bioreactor 15 of the invention is an enclosed space operating according to the water seal principle.

In FIGS. 2, 3 and 4, the supporting structure of the bioreactor 15 has been indicated with reference numeral 37. The suspension mill is indicated by reference numeral 13a and the suspension sludge pump by reference numeral 38. The gas venting pipe is indicated by reference numeral 26a.

In the embodiment of FIGS. 2 and 3, the bioreactor 15 of the invention is a bipartite reactor constituting an enclosed space presenting a gas space 39 and a liquid space 40. The bioreactor 15 is a dual step reactor comprisingan acid step 15a and a methane step 15b. As may be seen in FIG. 3, the bioreactor 15 may, if desired, be subdivided with partitions 41 into two or several blocks 42a, 42b, 42c etc.

As may be seen in FIG. 4, the undecomposed waste may be circulated with the aid of the sludge pump 38 through the circulation line 39' back to the suspension mill 13a. The construction of the bioreactor 15 of the invention is such that the gas that is generated cannot escape by any route other than the gas conduit system proper, 26a. The bioreactor 15 of the invention is easy to install on a level base, the supporting structure 17 preferably being a detachable supporting structure.

Any bacteria suitable for anaerobic decomposition may be used in accordance with the present invention.

The invention is not concerned with any specific bacteria, although bacteria most suitable for anaerobic decomposition of the particular materials such as paper, rags etc, is preferred.

While the invention has been described with respect to particular embodiments thereof, it is apparent that variations and modifications can be made without departing from the spirit or scope of the invention.

What is claimed is:

1. Method for treating low activity organic wastes from a nuclear power plant, which comprises:
   pre-treating said waste to render the same suitable for anaerobic decomposition,
   subjecting said pretreated waste to anaerobic decomposition in two stages, a first acid stage and a second methane stage, the anaerobic decomposition producing gasses,
   burning the gasses produced by the anaerobic decomposition, and
   collecting and packing the undecomposed waste for further disposition,
   whereby the volume of the waste is substantially reduced.

2. Method according to claim 1 wherein said pretreatment comprises comminution and suspension of the waste.

3. Method according to claim 1 wherein said pretreatment comprises hydrolysis and physical dispersion.

4. Method according to claim 1 wherein said pretreatment comprises irradiation or heat treatment.

5. Method according to claim 1 wherein chemicals for promoting the anaerobic decomposition are added in at least one of the acid or methane stages.

6. Method according to claim 5 wherein said chemicals are selected from the group consisting of nutrient salts, trace substances, pH regulating agents and thickening agents.

7. Method according to claim 6 wherein said nutrient salts are selected from the group consisting of nitrogen and phosphorus compounds, said trace substances are selected from the group consisting of cobalt, nickel or molybdenum and said thickening agents are flocculents.

8. Method according to claim 1 wherein undecomposed waste is recirculated for further anaerobic decomposition.

9. Method according to claim 1 wherein undecomposed waste is subjected to hydrolysis or physical dispersion and returned for further anaerobic decomposition.

10. Method according to claim 1 wherein said anaerobic decomposition is effected at a temperature of about 5°–65° C.

11. Method according to claim 1 wherein said anaerobic decomposition is effected at a temperature of about 20°–35° C.

12. The method of claim 1, wherein said steps are carried out to reduce the waste volume that is ultimately disposed to about 5–10% of the waste initially introduced into said process.

13. The method of claim 1, wherein said pre-treatment comprises preparing a suspension of said waste.

* * * * *